INVENTOR
Kenneth Earl Stutzman

United States Patent Office 3,253,787
Patented May 31, 1966

3,253,787
SELF-CONTAINED OXYGEN FUEL GAS TORCH
Kenneth Earl Stutzman, 19356 Cantara, Reseda, Calif.
Filed Sept. 17, 1962, Ser. No. 224,177
6 Claims. (Cl. 239—305)

The invention relates in general to oxygen and fuel supply systems and more particularly to oxygen and fuel supply systems for cutting, welding and heating torches.

Desirable features for a cutting, welding and heating torch are high performance, safety, portability or compactness, simplicity and economy. Existing equipment does not possess all of these features to a satisfactory degree.

It is therefore an object of the invention to provide the oxygen necessary to operate a cutting, welding and heating torch.

Another object of the invention is to produce a higher flame temperature by preheating the fuel and oxygen and thus achieve a higher degree of performance.

Another object of the invention is to supply cutting oxygen at an elevated temperature and thus achieve a higher degree of performance.

Another object of the invention is to eliminate the hazard of high pressure oxygen storage.

Another object of the invention is to attain a high degree of compactness in order to achieve greater portability.

Another object of the invention is to eliminate certain component parts in order to attain a higher degree of simplicity.

Another object of the invention is to promote the vaporization of liquid fuel by utilizing the heat from an exothermic oxygen evolving reaction.

Other objects and a fuller understanding of the invention may be had by referring to the following description and claims, taken in conjunction with the accompanying drawings in which:

Figure 1:
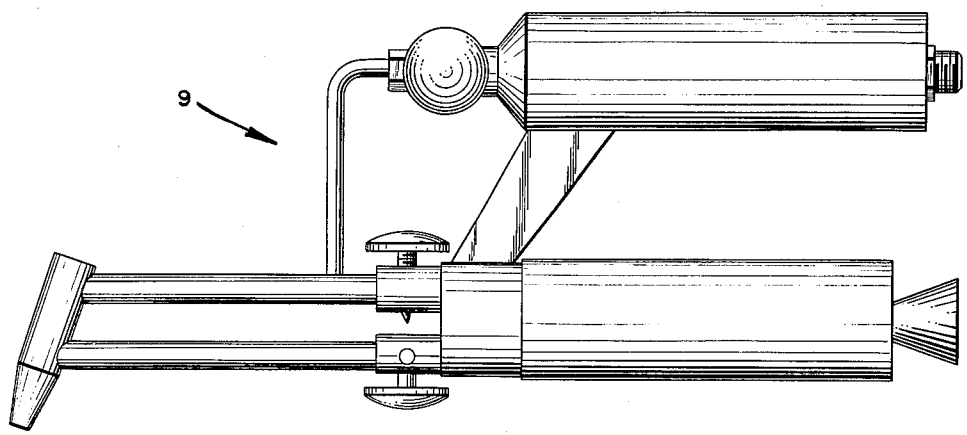
FIGURE 1 shows a cutting, welding and heating torch in which the invention may be incorporated.
Figure 2:
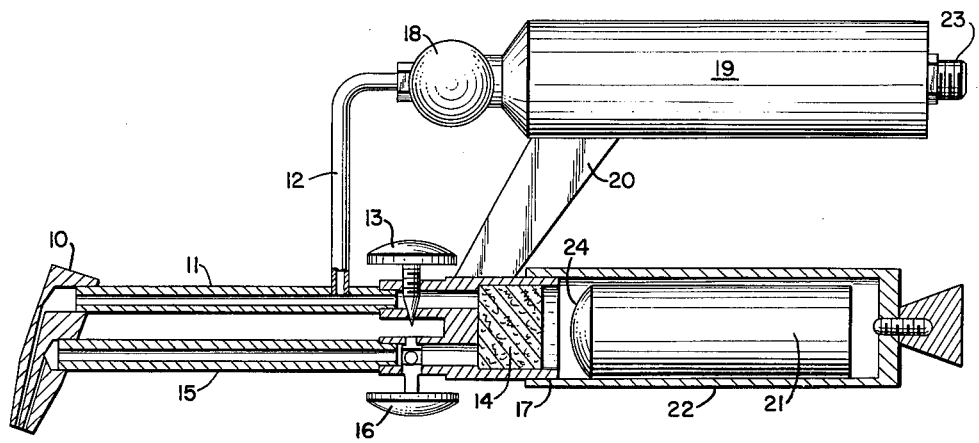
FIGURE 2 is a longitudinal cross-sectional view of the cutting, welding and heating torch shown in FIGURE 1 and illustrates the invention being incorporated therein.
Figure 3:
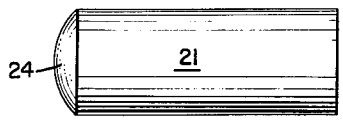
FIGURE 3 shows a view of the oxygen evolving pellet.

With reference to the drawing, the invention is illustrated as being incorporated in a self-contained type of cutting, welding and heating torch indicated generally by the reference character 9. As illustrated the cutting, welding and heating torch comprises a fuel container and handle 19 with a fill fitting 23 on one end and at the other end a fuel regulating valve 18 connected to the fuel delivery duct 12. The fuel delivery duct connects with and ducts fuel into the mixing duct 11 which is connected to the burner nozzle 10. The oxygen necessary for mixing with the fuel to provide the cutting, welding and heating flame is ducted from the oxygen supply system to the mixing duct 11 through the bleed valve 13. The mixing duct 11 connects with the oxygen filter assembly 14 which connects with and is separable from the oxygen container with handle 22 at the oxygen container separation joint 17. The oxygen necessary to perform the oxygen cutting operation is ducted to the burner nozzle 10 from the oxygen supply system through the oxygen delivery duct 15 containing an oxygen diverter valve 16 from the oxygen filter assembly 14. The oxygen evolving pellet 21 at one end of which is the oxygen evolving pellet ignition mixture 24 is contained within the oxygen container with handle 22. The connecting bracket 20 secures the oxygen supply system to the handle and fuel container 19 and serves as a heat conducting path between the oxygen container 22 and the fuel container 19.

Standard fabricating techniques, common to the welding device manufacturer, are used in producing the above mentioned component parts with the exception of the oxygen evolving pellet 21. This pellet is a compressed and bonded mixture containing the following ingredients by approximate weight percentages as indicated: Sodium chlorate 75.60%; powdered iron 12.10%; manganese dioxide 2.46%; barium peroxide 2.46%; chopped strand fiberglas 7.38%. These ingredients are mixed with 5% water, compressed in a mold and heated at approximately 300° F. until dry. After drying an ignition mixture is prepared containing the following ingredients by approximate weight percentage as indicated: Sodium chlorate 54.80%; powdered iron 21.40%; chopped strand fiberglas 9.52%; barium peroxide 9.52%; sucrose 4.28%; powdered aluminum .48%. The above ingredients are mixed with 15% water and a small amount of the ignition mixture is affixed to one end of the previously dried pellet and the pellet again heated at 300° F. until dry. By varying the cross sectional area of the pellet which is in the plane perpendicular to the longitudinal axis of the pellet or by varying within limits the chemical composition of the pellet, a variance in the rate of oxygen evolution is achieved.

Prior to operation the handle and fuel container is partially filled from an external supply with a liquified fuel such as propane which has a vapor pressure in excess of atmospheric pressure through the fill fitting 23. An alternate method of operation is to connect the fill fitting 23 to the vapor phase of the fuel supply tank and allow said connection to remain in place during the torch operation. To initiate the heating flame, the oxygen evolving pellet ignition mixture 24 is ignited. The oxygen evolving pellet 21, placed in the oxygen container 22, undergoes a chemical reaction which proceeds axially along the pellet and produces a continuous flow of gaseous oxygen for the duration of the chemical reaction. The oxygen container with handle 22 is then connected to the oxygen filter 14 at the oxygen container separation joint which is a flared friction fit which also provides a pressure limiting safety feature. The gaseous oxygen proceeds through the oxygen filter assembly 14 into the oxygen delivery duct. After flow of gaseous oxygen is initiated, the fuel regulating valve 18 is partially opened which allows the fuel gas from the handle and fuel container 19 to proceed through the fuel delivery duct 12 to the mixing duct 11. A combustible mixture is formed upon the mixing of the oxygen and fuel gas in the mixing duct 11. The combustible mixture proceeds into and through the burner nozzle 10 and is combusted upon exiting in the same manner as in conventional welding equipment. At this point the welding and heating flame has been achieved. Heat output control is obtained by bleeding a portion of the evolved oxygen into the atmosphere through the bleed valve 13. To initiate the cutting oxygen flow the oxygen diverter valve 16 is closed and the cutting oxygen flow which was being diverted into the atmosphere is now directed through the oxygen delivery duct 15 and into the burner nozzle 10.

Although I have described the invention with a degree of particularity, it is understood that the present disclosure has been made only by way of example and that numerous changes in the details of construction and the combination and arrangement of parts may be resorted to without departing from the spirit and the scope of the invention as hereinafter claimed.

What is claimed is:

1. In combination a liquid fuel container, an oxygen container, and a burner nozzle, a mixing duct and an oxygen delivery duct both leading from the oxygen container to the burner nozzle, valve means in the oxygen delivery duct for opening and closing the duct for flow of oxygen to the nozzle, bleed valve means in the mixing duct for venting a portion of the oxygen to the atmosphere and allowing another portion of the oxygen to pass through the mixing duct to the burner nozzle, a fuel delivery duct from the fuel container to the mixing duct downstream of the bleed valve means, said mixing duct functioning as a mixing chamber for fuel and oxygen, said fuel container containing a liquid fuel, a regulating valve in the fuel delivery duct for regulating the flow of vaporized fuel, connecting bracket means rigidly joining the two containers, said containers positioned to act as handles for the burner nozzle, said oxygen container containing a solid pellet of oxygen producing material, said pellet being exothermic upon the production of oxygen, said bracket means conducting heat from the oxygen container to the fuel container to assist in vaporizing the liquid fuel in the fuel container.

2. The combination of claim 1 further defined in that the valve means in the oxygen delivery duct is a diverter type valve permitting oxygen to either flow to the nozzle or be diverted to the atmosphere.

3. The combination of claim 1 further defined in that the liquid fuel in the fuel tank is a hydrocarbon type fuel.

4. The combination of claim 1 further defined in that the liquid fuel in the fuel tank is propane.

5. The combination of claim 1 further defined in that the solid pellet of oxygen producing material contains an alkali metal chlorate.

6. The combination of claim 1 further defined in that the solid pellet of oxygen producing material contains sodium chlorate.

References Cited by the Examiner

UNITED STATES PATENTS

| | | | |
|---|---|---|---|
| 1,099,613 | 6/1914 | Oliver et al. | 158—33 |
| 1,328,088 | 1/1920 | Lutz | 23—281 |
| 2,558,756 | 7/1951 | Jackson et al. | 23—281 |
| 2,998,703 | 9/1961 | Badders | 60—35.6 |
| 3,040,521 | 6/1962 | Broughton | 60—35.6 |
| 3,089,855 | 5/1963 | Bouvard | 23—281 |

FOREIGN PATENTS

| | | |
|---|---|---|
| 461,654 | 2/1937 | Great Britain. |
| 341,312 | 4/1936 | Italy. |

JAMES W. WESTHAVER, *Primary Examiner.*

FREDERICK L. MATTESON, Jr., MEYER PERLIN, *Examiners.*

V. M. BERUZZI, S. M. MILLARD, E. G. FAVORS, *Assistant Examiners.*